Sept. 19, 1950 W. E. SHOUPP 2,523,155
GLASS-TO-METAL SEALING
Filed May 24, 1944
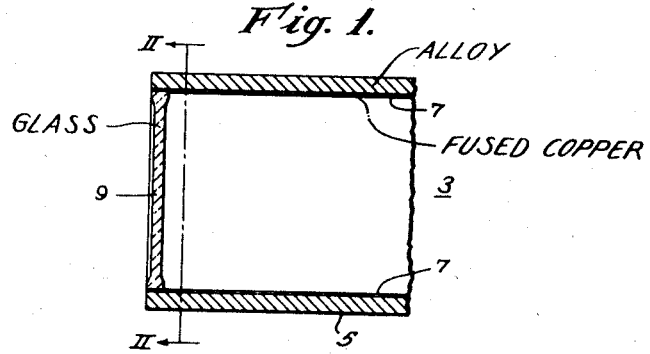
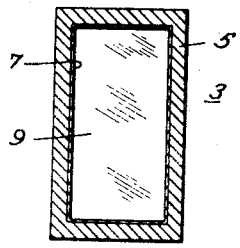
WITNESSES:
Edward Michaels
John R. Shipman
INVENTOR
William E. Shoupp.
BY
F. W. Lyle
ATTORNEY Patented Sept. 19, 1950

2,523,155

UNITED STATES PATENT OFFICE 2,523,155

GLASS-TO-METAL SEALING

William E. Shoupp, Wilkinsburg, Pa., assignor to Westinghouse Electric Corporation, a corporation of Pennsylvania Application May 24, 1944, Serial No. 537,022

17 Claims. (Cl. 178—44)

This invention relates to a vacuum-tight seal between a metallic member and a glass member and the method of producing such a seal.

In ultra-high frequency electric systems, it is often desirable to provide a vacuum-tight seal between a metallic member having a low-resistance path on a surface thereof and a glass member secured to that surface. For example, ultra-high frequency electromagnetic waves are commonly conducted from one point to another through a hollow-wave guide. The wave guide is formed of a metallic pipe and to enable the electromagnetic waves to pass therethrough, it is necessary that the pipe have a low resistance path on the inner surface thereof through which high frequency currents flow. Consequently, the wave guides are usually made of copper.

In using such guides, it is often necessary to maintain different portions thereof at different pressures while permitting the free passage of electromagnetic waves between these portions. As electromagnetic waves may pass through glass or quartz without undue losses, it has been suggested that a glass member or a quartz member be sealed across the interior of a wave guide between portions of the guide to be maintained at different pressures.

In attempting to seal a glass member across the interior of a hollow wave guide, a number of difficulties are encountered. If the wave guide is formed of copper or silver, the coefficient of expansion thereof is so much different from that of any available glass or quartz that a vacuum-tight seal cannot be maintained under conditions in which the temperature is varied. The metallic materials known in the art as having substantially the same coefficient of expansion as an available glass or quartz may be used to form the guide with the member of corresponding glass or quartz sealed across the interior. For example, if the wave guide be formed of a suitable alloy comprised essentially of iron, nickel and cobalt a boro-silicate glass window having a matching coefficient of expansion may be easily sealed therein. However, these metallic materials do not provide the necessary low-resistance path on the inner surface of the guide.

It is accordingly an object of my invention to provide a vacuum-tight seal between a metallic member having a low-resistance path on the surface thereof and a glass member secured to said metallic member at said surface.

Another object of my invention is to provide a method of sealing a metallic member having a low-resistance path on a surface thereof to a glass member secured to said metallic member at said surface.

A further object of my invention is to provide an article comprising a metallic member having a low-resistance path on the surface thereof and a glass member secured to the metallic member at said surface with a vacuum-tight seal.

Other objects of my invention will become apparent from the following description of the method and the article when read in connection with the accompanying drawing, in which:

Figure 1 is a longitudinal section of a hollow wave guide having a glass window sealed across the interior thereof; and Fig. 2 is a section of the wave guide taken along lines II—II of Fig. 1.

Since the thickness of the low resistance path on the inner surface of a guide is relatively small and of the order of .003 of an inch, an attempt was made to accomplish these objects by copper plating the interior of a guide formed of an alloy comprising essentially iron, nickel and cobalt having a boro-silicate glass member of a matching coefficient of expansion sealed thereacross. However, the low-resistance path is not continuous in such an arrangement as there is no copper between the glass and the alloy at the point of the seal. A surface of a guide of this alloy was plated completely with a thin layer of copper and the glass member thereafter sealed to the copper plated surface, but the result was found to be unsatisfactory. Although unequal expansion of the metal and the glass was substantially avoided, the high-frequency current flowing through the copper developed sufficient heat that the copper blistered and whenever such a blister occurred at the point of the seal, the seal was broken.

I have discovered that a vacuum-tight glass-to-metal seal may be produced between glass and a copper plated alloy comprised essentially of iron, nickel and cobalt, which may be used in forming a glass window across a guide of the copper plated alloy. In producing a seal according to my invention, a piece of the alloy is first plated with a relatively thin layer of copper. The copper plated alloy is then heated in a hydrogen atmosphere until the copper becomes soft and fluid. The copper plated alloy is then removed from the hydrogen atmosphere and a boro-silicate glass fused thereto at the copper plated surface. The glass preferably has substantially the same coefficient of expansion as the alloy. For example, the G704P glass of the Corning Glass Company of Corning, N. Y., may be used with an alloy of approximately 30% nickel, 18% cobalt and the remainder iron.

I am not aware of the exact chemical effect produced by the heating of the copper plated alloy in the hydrogen atmosphere. Apparently, it removes whatever elements are present which would cause blistering of the copper when heated. Seals which have been made by this method have beeen quite strong and have remained vacuum-tight under temperature changes without harmful blistering of the copper. Such temperature changes broke seals formed by merely fusing the glass to the copper plated alloy without the intermediate step of heating in a hydrogen atmosphere.

As shown in Figs. 1 and 2, the above-described method of making a seal may be usefully employed in connection with a hollow wave guide 3 for ultra-high frequency electro-magnetic waves. The guide is in the form of a pipe 5 of a suitable alloy comprised essentially of iron, nickel and cobalt with a cooper covering 7 plated on its interior surface. The relative thicknesses of the alloy and the copper covering are such that the expansion and contraction of the complete guide under temperature changes such as would be encountered in the use thereof, is substantially controlled by the expansion of the alloy. For example, the alloy may be of the order of 1/16 of an inch thick with a copper plating about .003 of an inch thick.

A glass window 9 is provided across the interior of the guide and is formed of a boro-silicate glass having substantially the same coefficient of expansion as the alloy. The glass window 9 is fused at its edges to the copper plated surface of the guide 3 to form a vacuum-tight seal. Thus a wave guide having a continuous low resistance path on its interior surface with a glass window secured across the interior of the guide with a vacuum-tight seal at the interior surface thereof is produced.

Although I have shown and described a specific embodiment of my invention, I do not intend to limit the scope of my invention thereto as other modifications may be made without departing from the inventive concept.

I claim as my invention:

1. The method of producing a vacuum-tight seal between a copper coated alloy member and a boro-silicate glass, the alloy being comprised of approximately 30% nickel, 18% cobalt and the remainder iron, which includes heating the copper coated member in a hydrogen atmosphere to a temperature at which the copper becomes substantially fluid, and thereafter fusing the glass to the copper coated member.

2. The method of producing an article including a metallic member having a low-resistance path on a surface thereof and a glass member secured to said metallic member at said surface with a vacuum-tight seal, which comprises coating a surface of an alloy with a layer of copper to provide the metallic member, the alloy being comprised essentially of iron, nickel and cobalt with the relative thickness of the alloy and the copper layer being such that the expansion and contraction of the metallic member under temperature changes is substantially controlled by the expansion and contraction of the alloy, heating the metallic member so provided in a hydrogen atmosphere to a temperature at which the copper becomes substantially fluid, and thereafter fusing a boro-silicate glass member to the metallic member at said surface, the glass having substantially the same coefficient of expansion as said alloy.

3. The method of producing an article including a metallic member having a low-resistance path on a surface thereof and a glass member secured to said metallic member at said surface with a vacuum-tight seal, which comprises coating a surface of an alloy with a layer of copper to provide the metallic member, the alloy being comprised of approximately 30% nickel, 18% cobalt and the remainder iron with the relative thickness of the alloy and the layer of copper being such that the expansion and contraction of the metallic member under temperature changes is substantially controlled by the expansion and contraction of the alloy, heating the metallic member thus provided in a hydrogen atmosphere to a temperature at which the copper becomes substantially fluid, and thereafter fusing a boro-silicate glass member to the metallic member at said surface, said glass member having substantially the same coefficient of expansion as said alloy.

4. A vacuum-tight seal between a metallic member of an alloy comprised of approximately 30% nickel, 18% cobalt and the remainder iron with a copper coating on a surface thereof, said member having the characteristics imparted thereto by having been heated in a hydrogen atmosphere to a temperature at which copper becomes substantially fluid, and a boro-silicate glass member fused to said metallic member at said surface.

5. A vacuum-tight seal between a metallic member of an alloy comprised essentially of iron, nickel and cobalt with a copper coating on a surface thereof, said member having the characteristics imparted thereto by having been heated in a hydrogen atmosphere to a temperature at which copper becomes substantially fluid, the relative thickness of the alloy and copper coating being such that the expansion and contraction of the metallic member with temperature changes is substantially controlled by the expansion and contraction of the alloy, and a boro-silicate glass member having substantially the same coefficient of expansion as said alloy fused to said metallic member at said surface.

6. A vacuum-tight seal between a metallic member of an alloy comprised of approximately 30% nickel, 18% cobalt and the remainder iron with a copper coating on a surface thereof, said member having the characteristics imparted thereto by having been heated in a hydrogen atmosphere to a temperature at which copper becomes substantially fluid, the relative thickness of the alloy and copper being such that the expansion and contraction of the metallic member with temperature changes is substantially controlled by the expansion and contraction of the alloy, and a boro-silicate glass member fused to said metallic member at said surface and having substantially the same coefficient of expansion as said alloy.

7. The method of producing an article including a member having a low-resistance path on a surface thereof and a glass element secured to said member at said surface with a vacuum-tight seal, which includes coating a surface of a metal with a layer of copper to provide said member, the relative thickness of said metal and said copper layer being such that the expansion and contraction of the member under temperature changes is substantially controlled by the expansion and contraction of said metal, heating the member thus provided in a hydrogen atmosphere to a temperature at which the copper becomes substantially fluid, and thereafter fusing a glass element to said member at said surface, said glass element having substantially the same coefficient of expansion as said metal.

8. A vacuum-tight seal between a member of a metal with a copper coating on a surface thereof, said metal having a higher electrical resistance than copper and said member having the characteristics imparted thereto by having been heated in a hydrogen atmosphere to a temperature at which copper becomes substantially fluid, the relative thickness of said metal and copper coating being such that the expansion and contraction of said member with temperature changes is substantially controlled by the expansion and contraction of the metal, and a glass member having substantially the same coefficient of expansion as said metal fused to said member at said surface.

9. The method of producing a vacuum-tight seal between a copper coated alloy member and a boro-silicate glass, the alloy being comprised essentially of iron, nickel and cobalt and having substantially the same coefficient of expansion as said glass; which includes heating the copper coated member in a hydrogen atmosphere to a temperature at which the copper becomes substantially fluid, and thereafter fusing the glass to the copper coated member.

10. The method of producing an article including a metallic member having a low-resistance path on a surface thereof and a glass member secured to said metallic member at said surface with a vacuum-tight seal; which comprises coating a surface of an alloy with a layer of copper to provide the metallic member, the alloy being comprised essentially of iron, nickel and cobalt; heating the metallic member so provided in a hydrogen atmosphere to a temperature at which the copper becomes substantially fluid, and thereafter fusing a boro-silicate glass member to the metallic member at said copper plated surface, said alloy having substantially the same coefficient of expansion as said glass member.

11. A vacuum-tight seal between a metallic member of an alloy comprised essentially of iron, nickel and cobalt with a copper coating on a surface thereof, said member having the characteristics imparted thereto by having been heated in a hydrogen atmosphere to a temperature at which copper becomes substantially fluid, and a boro-silicate glass member fused to said metallic member at said surface, said alloy having substantially the same coefficient of expansion as said glass.

12. The method of producing a vacuum-tight seal between a glass and a copper coated surface of a metallic member, said member having substantially the same coefficient of expansion as said glass; which includes heating the copper coated member in a hydrogen atmosphere to a temperature at which the copper becomes substantially fluid, and thereafter fusing the glass to the copper coated surface.

13. A vacuum-tight seal between a metallic member having a copper coating on a surface thereof, said member having the characteristics imparted thereto by having been heated in a hydrogen atmosphere to a temperature at which copper becomes substantially fluid, and a glass member fused to said metallic member at said surface, the portion of said member on which said copper is coated having substantially the same coefficient of expansion as said glass.

14. For use in an ultra-high-frequency system, having a wave guide for electromagnetic waves, different portions of which are to be maintained at different pressures; the combination comprising a pipe to be interposed in said wave guide, said pipe being composed of an alloy comprised essentially of iron, nickel and cobalt with a copper coating on the inner surface thereof, said pipe having the characteristics imparted thereto by having been heated in a hydrogen atmosphere to a temperature at which copper becomes substantially fluid, the relative thickness of the alloy and copper coating being such that the expansion and contraction of the pipe under temperature changes are substantially controlled by the expansion and contraction of the alloy, and a window of boro-silicate glass having substantially the same coefficient of expansion as said alloy mounted across the interior of said pipe and fused thereto with a vacuum-tight seal at the copper coated surface.

15. For use in an ultra-high-frequency system, having a wave guide for electromagnetic waves, different portions of which are to be maintained at different pressures, the combination comprising a pipe to be interposed in said wave guide, said pipe being composed of an alloy comprised of approximately 30% nickel, 18% cobalt and the remainder iron with a copper coating on the inner surface thereof, said pipe having the characteristics imparted thereto by having been heated in a hydrogen atmosphere to a temperature at which copper becomes substantially fluid, the relative thickness of the alloy and copper coating being such that the expansion and contraction of the pipe under temperature changes are substantially controlled by the expansion and contraction of the alloy, and a window of boro-silicate glass having substantially the same coefficient of expansion as said alloy mounted across the interior of said pipe and fused thereto with a vacuum-tight seal at the copper coated surface.

16. In combination a pipe of an alloy comprised essentially of iron, nickel and cobalt with a copper coating on the inner surface thereof, said pipe having the characteristics imparted thereto by having been heated in a hydrogen atmosphere to a temperature at which copper becomes substantially fluid, the relative thickness of the alloy and copper coating being such that the expansion and contraction of the pipe under temperature changes are substantially controlled by the expansion and contraction of the alloy, and a window of boro-silicate glass having substantially the same coefficient of expansion as said alloy mounted across the interior of said pipe and fused thereto with a vacuum-tight seal at the copper coated surface.

17. In combination a pipe of an alloy comprised approximately of 30% nickel, 18% cobalt and the remainder iron with a copper coating on the inner surface thereof, said pipe having the characteristics imparted thereto by having been heated in a hydrogen atmosphere to a temperature at which copper becomes substantially fluid, the relative thickness of the alloy and copper coating being such that the expansion and contraction of the pipe under temperature changes are substantially controlled by the expansion and contraction of the alloy, and a window of borosilicate glass having substantially the same coefficient of expansion as said alloy mounted across the interior of said pipe and fused thereto with a vacuum-tight seal at the copper coated surface.

WILLIAM E. SHOUPP.

REFERENCES CITED

The following references are of record in the file of this patent:

UNITED STATES PATENTS

| Number | Name | Date |
| --- | --- | --- |
| 1,498,908 | Fink | June 24, 1924 |
| 1,649,907 | Mayer | Nov. 22, 1927 |
| 1,680,738 | Hull | Aug. 14, 1928 |
| 2,062,335 | Scott | Dec. 1, 1936 |
| 2,089,044 | Thomas | Aug. 3, 1937 |
| 2,129,713 | Southworth | Sept. 13, 1938 |
| 2,200,023 | Dallenbach | May 7, 1940 |
| 2,223,082 | Van Mierlo | Nov. 26, 1940 |
| 2,390,805 | Merryman | Dec. 11, 1945 |
| 2,394,398 | Mouromtseff et al. | Feb. 5, 1946 |